United States Patent
Tanaka et al.

(10) Patent No.: US 7,591,596 B2
(45) Date of Patent: Sep. 22, 2009

(54) SHORT CHAIN-LIKE FERRULE STRUCTURE, CHAIN-LIKE FERRULE STRUCTURE AND METHOD OF PRODUCING CHAIN-LIKE FERRULE STRUCTURE

(75) Inventors: Shinya Tanaka, Gotemba (JP);
Hideyuki Kageyama, Makinohara (JP);
Yoshinori Yamanashi, Makinohara (JP);
Masaaki Sawairi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/757,593

(22) Filed: Jun. 4, 2007

(65) Prior Publication Data

US 2007/0280607 A1    Dec. 6, 2007

(30) Foreign Application Priority Data

Jun. 2, 2006    (JP)    ............................. 2006-154657

(51) Int. Cl.
*G02B 6/36* (2006.01)
(52) U.S. Cl. .............................. 385/76; 385/53; 385/55; 385/75; 385/77; 439/590; 439/717
(58) Field of Classification Search ........................ None
See application file for complete search history.

(56) References Cited

U.S. PATENT DOCUMENTS

| 5,954,539 | A | 9/1999 | Hornung | |
|---|---|---|---|---|
| 2002/0001438 | A1* | 1/2002 | Schuhbaeck et al. | .......... 385/78 |
| 2002/0182945 | A1 | 12/2002 | Axelsson | |

FOREIGN PATENT DOCUMENTS

| DE | 2908797 A1 | * | 9/1979 |
|---|---|---|---|
| DE | 10019392 A1 | | 12/2001 |
| DE | 10325825 A1 | | 1/2004 |
| JP | 2001-350054 A | | 12/2001 |

OTHER PUBLICATIONS

German Office Action dated Jul. 2, 2008.

* cited by examiner

*Primary Examiner*—Uyen Chau N Le
*Assistant Examiner*—Chad H Smith
(74) *Attorney, Agent, or Firm*—Sughrue Mion, PLLC

(57) ABSTRACT

A short chain-like ferrule structure 15 includes a plurality of ferrules 2, and an interconnecting portion 16 interconnecting the plurality of ferrules 2. This ferrule structure includes a connection portion 20 provided at that portion of the interconnecting portion 16 projecting from the ferrule 2 disposed at one end portion of the ferrule structure, and a connection reception portion 21 which is provided at that portion of the interconnecting portion 16 projecting from the ferrule 2 disposed at the other end portion of the ferrule structure, and is engageable with the connection portion 20 of another short chain-like ferrule structure. Projections 23 are formed at the connection portion 20, and project from the interconnecting portion 16, and holes 25 for the passage of the projections 23 of another short chain-like ferrule structure therethrough are formed in the connection reception portion 21, and extend through the interconnecting portion 16. The connection portion 20 and the connection reception portion 21 provided respectively at any two adjacent short chain-like ferrule structures 15 beforehand molded are connected together, thereby forming a chain-like ferrule structure 1.

11 Claims, 5 Drawing Sheets

SHORT CHAIN-LIKE FERRULE STRUCTURE, CHAIN-LIKE FERRULE STRUCTURE AND METHOD OF PRODUCING CHAIN-LIKE FERRULE STRUCTURE

BACKGROUND OF THE INVENTION

1. Field of the Invention

This invention relates to a short chain-like ferrule structure (having ferrules), a chain-like ferrule structure (having ferrules), and a method of producing the chain-like ferrule structure, the ferrules being adapted to be attached to end portions of optical fiber cables.

2. Description of the Related Art

Ferrules are mounted on end portions of optical fiber cables by the use of an assembling machine, and in this case an additional facility is required for supplying separate ferrules to the assembling machine, and therefore the cost has tended to increase. in order to reduce the cost and also to efficiently supply the ferrules, it has been desired to connect the ferrules into a chain-like form.

To solve these problems, various chain-like ferrule structures have been used (see, for example, Patent Literature 1). Such a chain-like ferrule structure comprises a plurality of ferrules, and an interconnecting portion interconnecting the ferrules. In the production of the chain-like ferrule structure, first, a short chain-like ferrule structure of an integral construction comprising a plurality of ferrules and an interconnecting portion interconnecting the ferrules is molded. Then, a second short chain-like ferrule structure is integrally molded to be connected to the first integrally-molded short chain-like ferrule structure. Then, a third short chain-like ferrule structure is integrally molded to be connected to the first and second short chain-like ferrule structures joined together. In this manners this process is repeated as a sequence of steps, thereby producing the chain-like ferrule structure of an integrally molded construction forming a long chain of ferrules.

Patent Literature 1: JP-A-2001-350054 Publication

The chain-like ferrule structure disclosed in the above Patent Literature 1 and others forms the long chain, and therefore the handling of this chain-like ferrule structure in a product checking process or others was cumbersome. And besides, when a defective product was found, the whole of the defective chain-like ferrule structure must be discarded.

SUMMARY OF THE INVENTION

It is therefore an object of this invention to provide a short chain-like ferrule structure which can easily deal with a defective product and can form a long chain, a chain-like ferrule structure which can be supplied to an assembling machine, and a method of producing this chain-like ferrule structure.

The above object has been achieved by a short chain-like ferrule structure of the invention of claim 1 including a plurality of ferrules adapted to be attached respectively to end portions of optical fiber cables, and an interconnecting portion interconnecting the plurality of ferrules; characterized in that the short chain-like ferrule structure includes a connection portion provided at that portion of the interconnecting portion projecting from the ferrule disposed at one end portion of the short chain-like ferrule structure, and a connection reception portion which is provided at that portion of the interconnecting portion projecting from the ferrule disposed at the other end portion of the short chain-like ferrule structure, and is engageable with the connection portion of another short chain-like ferrule structure.

According to the invention of claim 2, there is provided a short chain-like ferrule structure including one ferrule adapted to be attached to an end portion of an optical fiber cable, and an interconnecting portion projecting from opposite sides of the ferrule; characterized in that the short chain-like ferrule structure includes a connection portion provided at that portion of the interconnecting portion projecting from one of the opposite sides of the ferrule, and a connection reception portion which is provided at that portion of the interconnecting portion projecting from the other of the opposite sides of the ferrule, and is engageable with the connection portion of another short chain-like ferrule structure.

The short chain-like ferrule structure of the invention of claim 3, depending from claim 1, is characterized in that a projection is formed at the connection portion, and projects from the interconnecting portion, and a hole for the passage of the projection of another short chain-like ferrule structure therethrough is formed in the connection reception portion, and extends through the interconnecting portion.

According to the invention of claim 4, there is provided a chain-like ferrule structure characterized in that the chain-like ferrule structure comprises a plurality of short chain-like ferrule structures as defined in any one of claims 1 to 3, and any two adjacent short chain-like ferrule structures are interconnected by engaging the connection portion of one of the two short chain-like ferrule structures with the connection reception portion of the other short chain-like ferrule structure.

The chain-like ferrule structure of claim 5, depending from claim 4, is characterized in that the ferrules are arranged parallel to one another.

The chain-like ferrule structure of claim 6, depending from claim 4, is characterized in that the ferrules are arranged at equal intervals.

According to the invention of claim 7, there is provided a method of producing a chain-like ferrule structure comprising a plurality of short chain-like ferrule structures, each of the short chain-like ferrule structures including a plurality of ferrules adapted to be attached respectively to end portions of optical fiber cables, an interconnecting portion interconnecting the plurality of ferrules, a connection portion provided at that portion of the interconnecting portion projecting from the ferrule disposed at one end portion of the short chain-like ferrule structure, and a connection reception portion which is provided at that portion of the interconnecting portion projecting from the ferrule disposed at the other end portion of the short chain-like ferrule structure, and is engageable with the connection portion of the adjacent short chain-like ferrule structure; characterized in that the short chain-like ferrule structures are beforehand molded, and any two adjacent molded short chain-like ferrule structures are interconnected by engaging the connection portion of one of the two short chain-like ferrule structures with the connection reception portion of the other short chain-like ferrule structure, thereby producing the chain-like ferrule structure.

The short chain-like ferrule structure of the invention of claim 1 includes the plurality of ferrules, the connection portion, and the connection reception portion engageable with the connection portion. Therefore, two short chain-like ferrule structures can be interconnected by connecting the connection portion of one of the two short chain-like ferrule structures to the connection reception portion of the other short chain-like ferrule structure.

The short chain-like ferrule structure of the invention of claim 2 includes the single ferrule, a connection portion, and a connection reception portion engageable with the connection portion. Therefore, two short chain-like ferrule structures can be interconnected by connecting the connection portion of one of the two short chain-like ferrule structures to the connection reception portion of the other short chain-like ferrule structure.

In the short chain-like ferrule structure of the invention of claim 3, the projection is formed at the connection portion, and the hole for the passage of the projection therethrough is formed in the connection reception portion. Therefore, two short chain-like ferrule structures can be easily interconnected by engaging the projection on the connection portion of one of the two short chain-like ferrule structures in the hole in the connection reception portion of the other short chain-like ferrule structure.

In the chain-like ferrule structure of the invention of claim 4, any two adjacent short chain-like ferrule structures are interconnected by connecting the connection portion of the interconnecting portion of one of the two short chain-like ferrule structures to the connection reception portion of the interconnecting portion of the other short chain-like ferrule structure, thereby forming the chain-like ferrule structure. Therefore, the short chain-like ferrule structures are beforehand molded, and any two adjacent molded short chain-like ferrule structures are interconnected, and by doing so, the chain-like ferrule structure can be produced. And besides, the plurality of ferrules can be sequentially fed.

In the chain-like ferrule structure of the invention of claim 5, the ferrules are arranged parallel to one another through the interconnecting portions. Therefore, the plurality of ferrules can be sequentially fed in a predetermined condition.

In the chain-like ferrule structure of the invention of claim 6, the ferrules are arranged at equal intervals through the interconnecting portions. Therefore, the plurality of ferrules can be sequentially fed in a predetermined condition.

In the chain-like ferrule producing method of the invention of claim 7, any two adjacent short chain-like ferrule structures are interconnected by connecting the connection portion of one of the two short chain-like ferrule structures to the connection reception portion of the other short chain-like ferrule structure, thereby producing the chain-like ferrule structure. Therefore, the chain-like ferrule structure can be produced using only the preselected short chain-like ferrule structures.

As described above, the short chain-like ferrule structure of the invention of claim 1 includes the plurality of ferrules, the connection portion, and the connection reception portion engageable with the connection portion. Therefore, two short chain-like ferrule structures can be interconnected by connecting the connection portion of one of the two short chain-like ferrule structures to the connection reception portion of the other short chain-like ferrule structure. Therefore, the chain-like ferrule structure which can be supplied to the assembling machine can be produced. And besides, defective short chain-like ferrule structures are beforehand excluded, and only good short chain-like ferrule structures are interconnected to produce the chain-like ferrule structure. Therefore, even when any short chain-like ferrule structure is found to be defective, this can be dealt with by a minimum discard, that is, by discarding only such defective product, without the need for discarding the whole of the chain-like ferrule structure found defective.

The short chain-like ferrule structure of the invention of claim 2 includes the single ferrule, the connection portion, and the connection reception portion engageable with the connection portion. Therefore, two short chain-like ferrule structures can be interconnected by connecting the connection portion of one of the two short chain-like ferrule structures to the connection reception portion of the other short chain-like ferrule structure. Therefore, the chain-like ferrule structure which can be supplied to the assembling machine can be produced. And besides, defective short chain-like ferrule structures are beforehand excluded, and only good short chain-like ferrule structures are interconnected to produce the chain-like ferrule structure. Therefore, even when any short chain-like ferrule structure is found to be defective, this can be dealt with by a minimum discard, that is, by discarding only such defective product, without the need for discarding the whole of the chain-like ferrule structure found defective.

In the invention of claim 3, the projection is formed at the connection portion, and the hole for the passage of the projection therethrough is formed in the connection reception portion. Therefore, two short chain-like ferrule structures can be easily interconnected by engaging the projection on the connection portion of one of the two short chain-like ferrule structures in the hole in the connection reception portion of the other short chain-like ferrule structure. Therefore, the chain-like ferrule structure which can be supplied to the assembling machine can be easily produced.

In the invention of claim 4, any two adjacent short chain-like ferrule structures are interconnected by connecting the connection portion of the interconnecting portion of one of the two short chain-like ferrule structures to the connection reception portion of the interconnecting portion of the other short chain-like ferrule structure, thereby forming the chain-like ferrule structure. Therefore, the short chain-like ferrule structures are beforehand molded, and any two adjacent molded short chain-like ferrule structures are interconnected, and by doing so, the chain-like ferrule structure can be produced. Therefore, the plurality of ferrules can be sequentially fed, and an operation for connecting the optical fiber cable to the ferrule and other operations can be automated. Furthermore, defective short chain-like ferrule structures are beforehand excluded, and only good short chain-like ferrule structures are interconnected to produce the chain-like ferrule structure. Therefore, even when any short chain-like ferrule structure is found to be defective, this can be dealt with by a minimum discard, that is, by discarding only such defective product, without the need for discarding the whole of the chain-like ferrule structure found defective.

In the invention of claim 5, the ferrules are arranged parallel to one another through the interconnecting portions. Therefore, the plurality of ferrules can be sequentially fed in a predetermined condition. Therefore, the operation for connecting the optical fiber cable to the ferrule and other operations can be more easily automated.

In the invention of claim 6, the ferrules are arranged at the equal intervals through the interconnecting portions. Therefore, the plurality of ferrules can be sequentially fed in a predetermined condition. Therefore, the operation for connecting the optical fiber cable to the ferrule and other operations can be more easily automated.

In the invention of claim 7, any two adjacent short chain-like ferrule structures beforehand molded are interconnected by connecting the connection portion of one of the two short chain-like ferrule structures to the connection reception portion of the other short chain-like ferrule structure, thereby producing the chain-like ferrule structure. Therefore, the chain-like ferrule structure can be produced using only the preselected short chain-like ferrule structures. Therefore, defective short chain-like ferrule structures are beforehand excluded, and only good short chain-like ferrule structures are interconnected to produce the chain-like ferrule structure. Therefore, even when any short chain-like ferrule structure is found to be defective, this can be dealt with by a minimum

DESCRIPTION OF THE PREFERRED EMBODIMENTS

Figure 1:
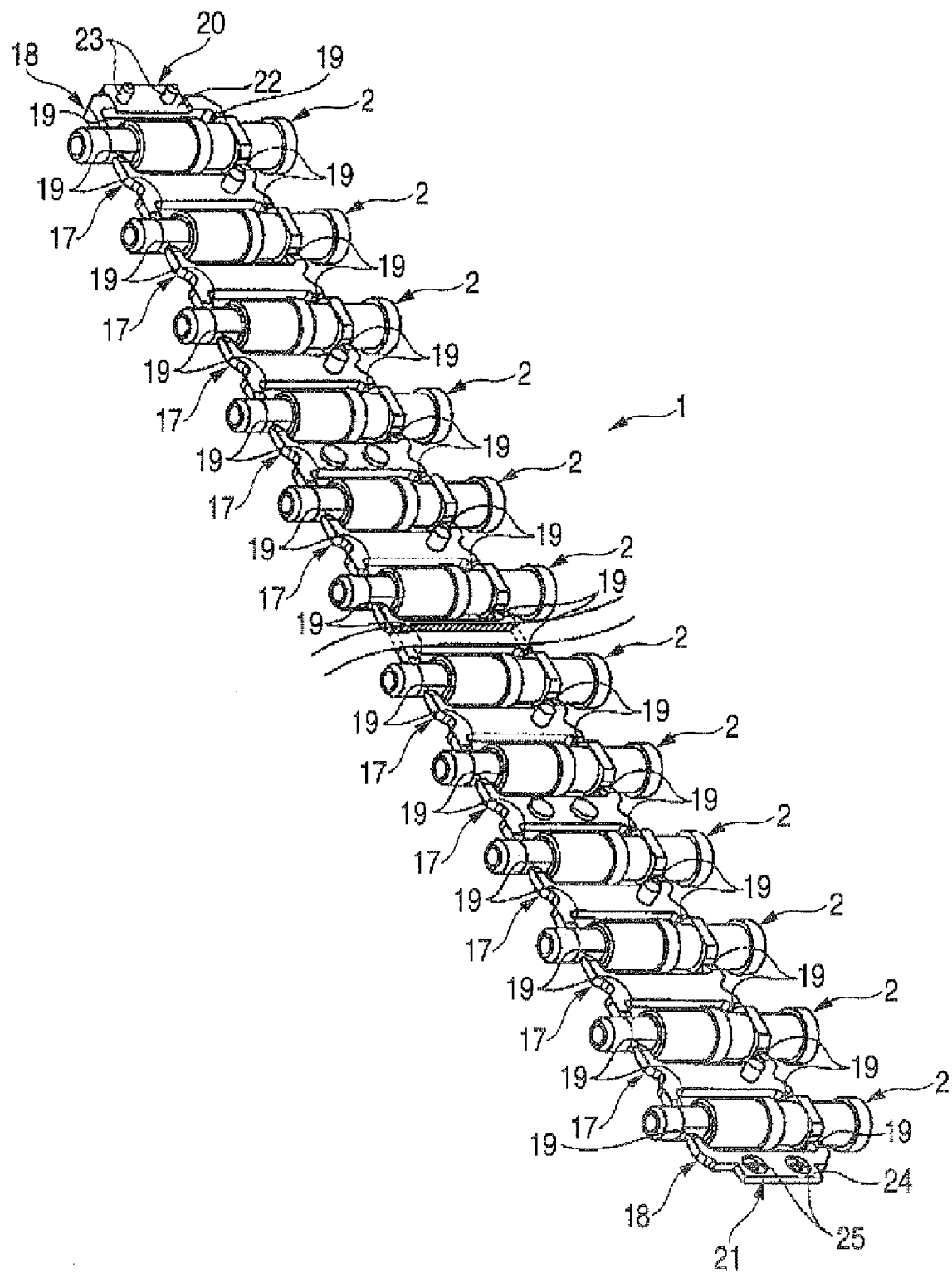
FIG. 1 is a perspective view of one preferred embodiment of a chain-like ferrule structure of the present invention.

A chain-like ferrule structure and a short chain-like ferrule structure which embody the present invention will now be described with reference to FIGS. 1 to 9. As shown in FIG. 1, one preferred embodiment of the chain-like ferrule structure 1 of the invention comprises a plurality of ferrules 2. The ferrules 2 are used in a pair of optical connectors 3a and 3b which are fitted to each other as shown in FIG. 8.

Figure 8:
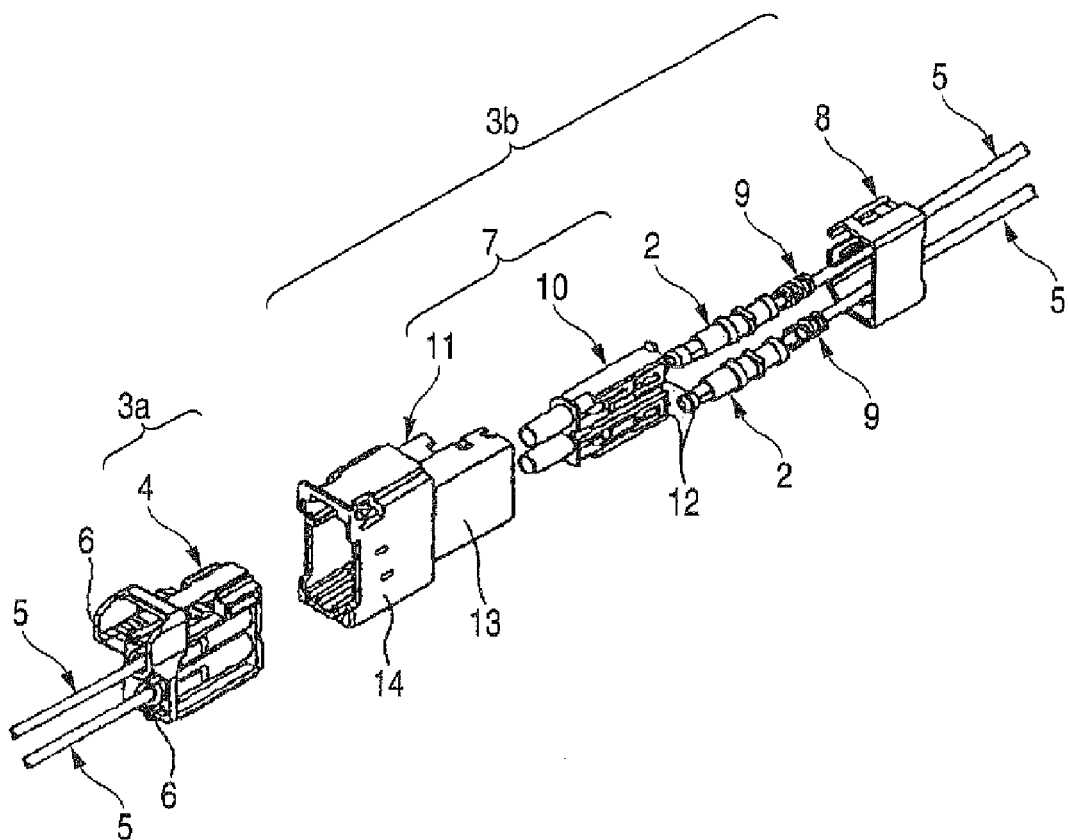
FIG. 8 is a perspective view of optical connectors provided with ferrules of the chain-like ferrule structure of FIG. 1.

As shown in FIG. 8, the optical connector 3a comprises the pair of ferrules 2, and a housing 4. End portions of optical fiber cables 5 are attached to the ferrules 2, respectively. The construction of the ferrule 2 will be described later.

The housing 4 is made of a synthetic resin, and is formed into a box-like shape. The housing 4 has receiving chambers 6 which receive the respective ferrules 2 and the end portions of the respective optical fiber cables 5 attached to the respective ferrules 2. Each receiving chamber 6 is a space of a round cross-section. The housing 4 receives the pair of ferrules 2 in such a manner that optical axes of the optical fiber cables 5 are disposed parallel to each other.

The ferrules 2 are attached to the end portions of the optical fiber cables 5, respectively. The ferrules 2 attached to the end portions of the respective optical fiber cables 5 are received in the housing 2. Thus, the optical connector 3a is assembled.

As shown in FIG. 8, the optical connector 3b comprises the pair of ferrules 2, a housing 7, a spring cap 8, and a pair of coil springs 9 serving as urging means. These ferrules are identical in construction to the ferrules 2 of the above-mentioned optical connector 3a. The construction of the ferrule 2 will be described later. End portions of optical fiber cables 5 are attached to the ferrules 2, respectively.

The housing 7 comprises an inner housing 10, and an outer housing 11. The inner housing 10 is made of a synthetic resin, and is formed into a tubular shape. The inner housing 10 has receiving chambers 12 which receive the respective ferrules 2 in such a manner that optical axes of the optical fiber cables 5 attached to the respective ferrules 12 are disposed parallel to each other. Each receiving chamber 12 is a space of a round cross-section.

The outer housing 11 is made of a synthetic resin, and is formed into a tubular shape. The outer housing 11 includes an inner housing receiving portion 13 of a tubular shape, and a connector fitting portion 14 of a tubular shape formed integrally with the inner housing receiving portion 13. The inner housing receiving portion 13 and the connector fitting portion 14 are arranged along the optical axes of the optical fiber cables 5. The inner housing receiving portion 13 receives the inner housing 10. The connector fitting portion 14 is fitted to the optical connector 3a.

The spring cap 8 is in the form of a tube with a closed bottom. Passage holes for the passage of the optical fiber cables 5 therethrough are formed through a bottom wall of the spring cap 8. The spring cap 8 is fitted on the inner housing receiving portion 13, and is fitted to the outer housing 11 and hence to the housing 7.

Each coil spring 9 has the optical fiber cable 5 passed therethrough. The coil spring 9 is disposed between the ferrule 2 and the bottom wall of the spring cap 8 in such a manner that the optical fiber cable 5 attached at its end portion to the ferrule 2 passes through the coil spring 9. The coil spring 9 urges the ferrule 2 toward the connector fitting portion 4 and hence toward the optical connector 3a.

The end portions of the optical fiber cables 5 are attached to the ferrules 2, respectively. The optical fiber cables 5 are passed respectively through the coil springs 9, and these coil springs 9 are brought into contact with the ferrules 2, respectively. The inner housing 10 is inserted into the outer housing 11. The optical fiber cables 5 are passed respectively through the passage holes. At this time, each coil spring 9 is held between the corresponding ferrule 2 and the bottom wall of the spring cap 8. The spring cap 8 is fitted to the outer housing 11.

Thus, the above optical connector 3b is assembled. When the optical connectors 3a and 3b are fitted to each other, the optical fiber cables 5 of the optical connector 3a are opposed respectively to the optical fiber cables 5 of the optical connector 3b through the ferrules 2. Namely, the optical fiber cables 5 of the optical connector 3a are optically connected or coupled respectively to the optical fiber cables 5 of the optical connector 3b.

The ferrules 2 of the optical connector 3a optically connect the optical fiber cables 5 of this optical connector 3a respectively to the optical fiber cables 5 of the optical connector 3b serving as mating optical equipments. The ferrules 2a of the optical connector 3b optically connect the optical fiber cables 5 of this optical connector 3b respectively to the optical fiber cables 5 of the optical connector 3a serving as mating optical equipments.

Namely, the mating optical equipments for the ferrules 2 of the optical connector 3a are the optical fiber cables 5 of the optical connector 3b. The mating optical equipments for the ferrules 2 of the optical connector 3b are the optical fiber cables 5 of the optical connector 3a.

Each of the ferrules 2 of the optical connectors 3a and 3b is formed into a round tubular shape so as to receive the end portion of the optical fiber cable 5. A plurality of ferrules 2 form the chain-like ferrule structure 1 as shown in FIG. 1, and also a plurality of ferrules 2 form the short chain-like ferrule structure 15 as shown in FIG. 2.

Figure 2:
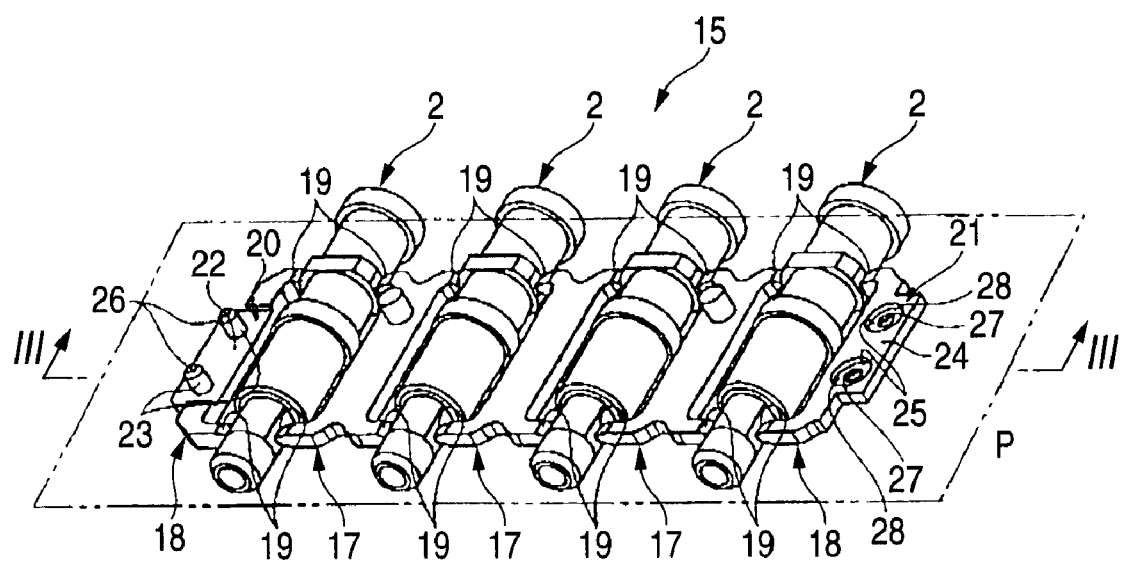
FIG. 2 is a perspective view of a short chain-like ferrule structure used to form the chain-like ferrule structure of FIG. 1.
Figure 3:
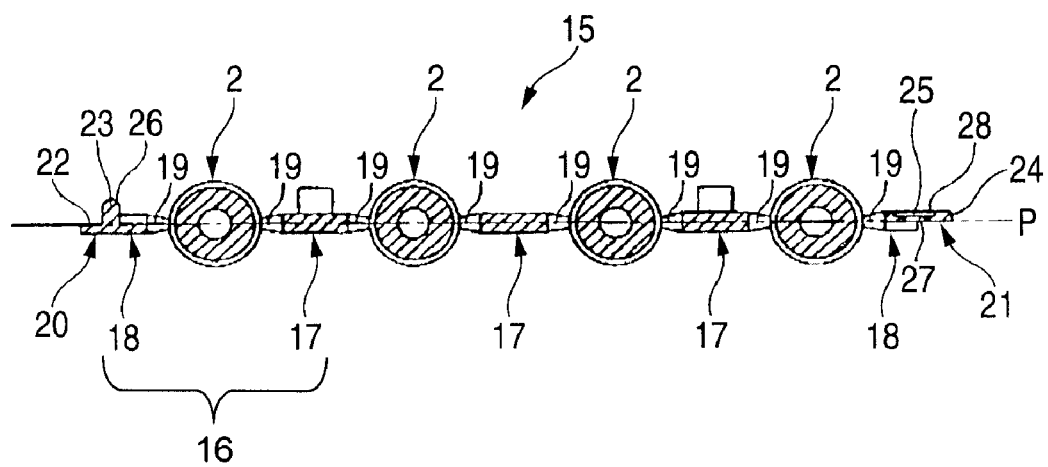
FIG. 3 is a cross-sectional view taken along the line III-III of FIG. 2.

As shown in FIGS. 2 and 3, the short chain-like ferrule structure 15 is molded into an integral construction, using a synthetic resin. The short chain-like ferrule structure 15 includes the plurality of ferrules 2, and an interconnecting portion 16 interconnecting the plurality of ferrules 2. In the short chain-like ferrule structure 15, the plurality of ferrules 2 are arranged at equal intervals and are interconnected by the interconnecting portion 16. In the illustrated embodiment of FIG. 2, the short chain-like ferrule structure 15 has the four ferrules 2.

The interconnecting portion 16 has a generally flat plate-shape. The interconnecting portion 16 is disposed in a plane P (indicated by a dots-and-dash line in FIG. 2) in which optical axes of all of optical fiber cables 5 to be attached respectively to the plurality of ferrules 2 lie. The interconnecting portion 16 includes interconnecting piece portions 17 each interconnecting the corresponding adjacent ferrules 2, and projecting piece portions 18 projecting outwardly respectively from the two ferrules 2 disposed respectively at opposite end portions of the short chain-like ferrule structure.

All of the interconnecting piece portions 17 and all of the projecting piece portions 18 have a generally uniform thickness over the entire length of the short chain-like ferrule structure. The interconnecting piece portions 17 and the projecting piece portions 18 have connecting portions 19 each gradually decreasing in thickness toward the ferrule 2. Each projecting piece portion 18 is connected to the ferrule 2 by the connecting portion 19, and each interconnecting piece portion 17 is connected to the adjacent ferrules 2 by the respective connecting portions 19. The two projecting piece portions 18 of the short chain-like ferrule structure 15 include a connection portion 20 and a connection reception portion 21, respectively, the connection reception portion 21 being engageable with the connection portion 20 of another short chain-like ferrule structure 15.

The connection portion 20 is provided at the portion of the interconnecting portion 16 projecting from the ferrule 2 disposed at one end portion of the short chain-like ferrule structure 15, that is, provided at one of the two projecting piece portions 18 each connected to only one ferrule 2. The connection portion 20 includes a flat plate portion 22 continuous with the projecting piece portion 18, and two projections 23 formed on and extending upright from the flat plate portion 22. A thickness of the flat plate portion 22 is generally half of the thickness of the other portion of the projecting piece portion 18 where the flat plate portion 22 is not provided. The flat plate portion 22 is generally equal in size to a flat plate portion 24 of the connection reception portion 21 (described later).

The connection reception portion 21 is provided at the portion of the interconnecting portion 16 projecting from the ferrule 2 disposed at the other end portion of the short chain-like ferrule structure 15, that is, provided at the other of the two projecting piece portions 18 each connected to only one ferrule 2. The connection reception portion 21 is so constructed as to be engaged with the connection portion 20. The connection reception portion 21 includes the flat plate portion 24 continuous with the projecting piece portion 18, and two holes 25 formed through the flat plate portion 24. A thickness of the flat plate portion 24 is generally half of the thickness of the other portion of the projecting piece portion 18 where the flat plate portion 24 is not provided. The flat plate portion 24 is generally equal in size to the flat plate portion 22 of the connection portion 20.

The projections 23 are formed on the interconnecting portion 16, that is, project upright from the flat plate portion 22 of the connection portion 20 of the one projecting piece portion 18. There are provided the two projections 23. Each projection 23 is formed into a generally cylindrical shape. A tapering portion 26 is formed at a distal end portion of the projection 23.

The holes 25 are formed through the interconnecting portion 16, that is, through the flat plate portion 24 of the connection reception portion 21 of the other projecting piece portion 18. There are provided the two holes 25. Each hole 25 is so formed that the projection 23 can pass therethrough. Each hole 25 has a smaller-diameter portion 27 and a larger-diameter portion 28. The smaller-diameter portion 27 and the larger-diameter portion 28 are disposed coaxially, that is, arranged serially in this order in a direction in which the projection 23 projects upright perpendicularly to the plane P. An inner diameter of the smaller-diameter portion 27 is generally equal to an outer diameter of the projection 23, and an inner diameter of the larger-diameter portion 28 is fairly larger than the outer diameter of the projection 23.

The distance from the two projections 23 to the ferrule 2 nearest thereto is half of the distance between any two adjacent ferrules 2, and similarly the distance from the two holes 25 to the ferrule 2 nearest thereto is half of the distance between any two adjacent ferrules. The two projections 23, as well as the two holes 25, are arranged on a line parallel to the optical axes of the optical fiber cables 5. The distance between the two projections 23 is equal to the distance between the two holes 25.

Figure 4:
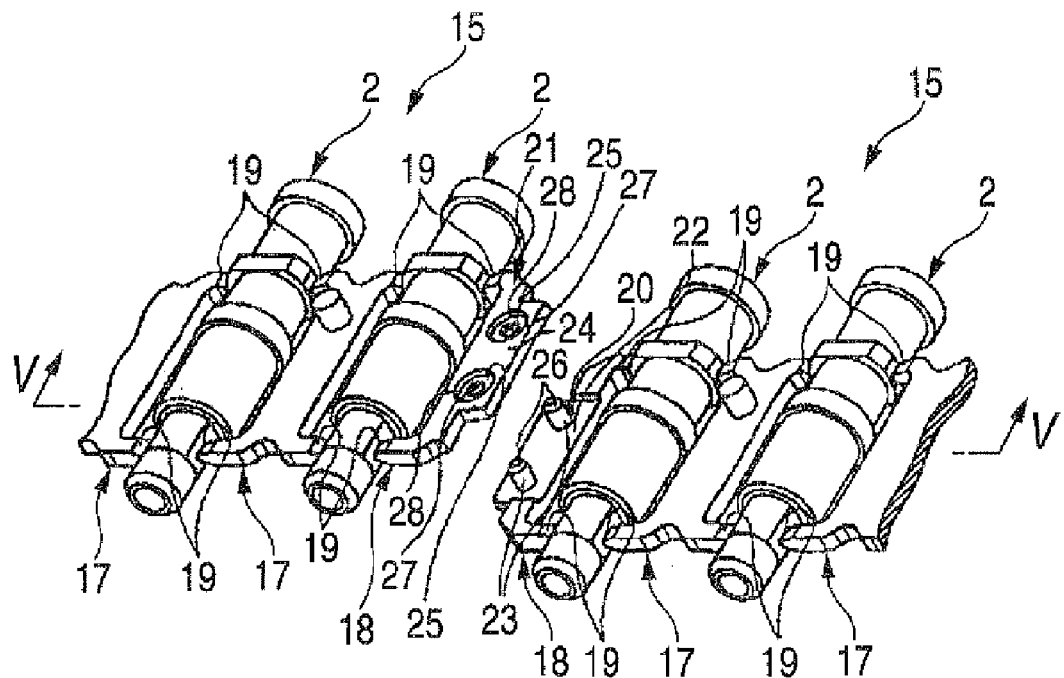
FIG. 4 is a perspective view showing two short chain-like ferrule structures of FIG. 2 juxtaposed to each other.
Figure 5:
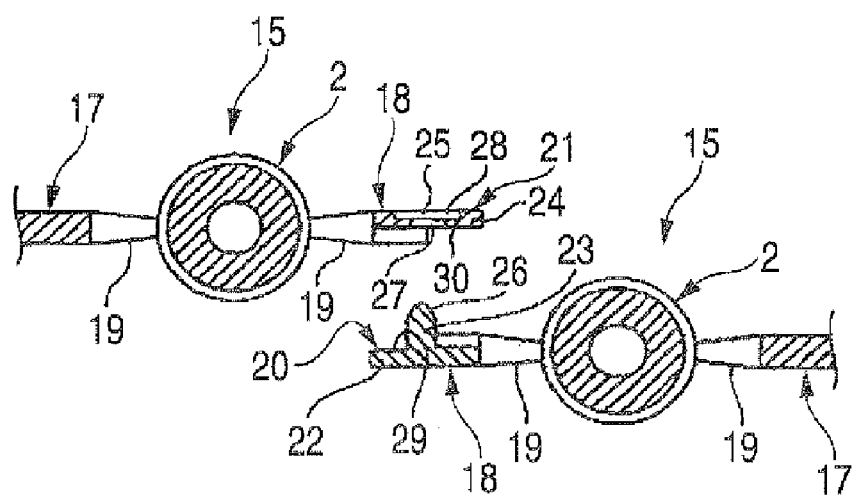
FIG. 5 is a cross-sectional view taken along the line V-V of FIG. 4.

When two short chain-like ferrule structures 15 of the above construction are to be connected together, first, the two short chain-like ferrule structures 15 each beforehand molded are arranged generally in a row in such a manner that the ferrules 2 are oriented in the same direction and that the projections 23 are oriented in the same direction, as shown in FIGS. 4 and 5. As a result, the two projections 23 of one short chain-like ferrule structure 15 are disposed adjacent to the two holes 25 of the other short chain-like ferrule structure 15.

Figure 6:
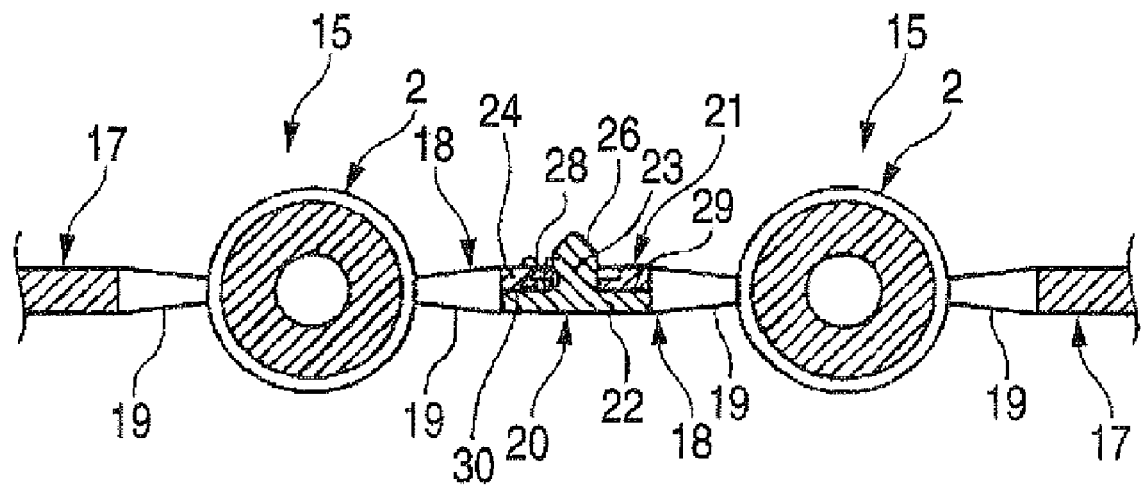
FIG. 6 is a cross-sectional view showing a condition in which projections of one of the two short chain-like ferrule structures of FIG. 5 are passed through respective holes in the other short chain-like ferrule structure.

Then, the flat plate portion 24 of the other short chain-like ferrule structure 15 is superposed on the flat plate portion 22 of the one short chain-like ferrule structure 15 as shown in FIG. 5. The two projections 23 can be inserted respectively into the two holes 25 since the distance between the two projections 23 is equal to the distance between the two holes 25. First, the distal end portion of each projection 23 passes through the smaller-diameter portion 27 of the corresponding hole 25. The outer diameter of the projection 23 is generally equal to the inner diameter of the smaller-diameter portion 27, but the tapering portion 26 is formed at the distal end portion of the projection 23, and therefore the projection 23 can be easily guided into the hole 25. Subsequently, each projection 23 passes through the larger-diameter portion 28 and hence extends through the flat plate portion 24, so that the two projections 23 are engaged respectively in the two holes 25 as shown in FIG. 6. At this time, that side (i.e., one surface) 29 of the flat plate portion 22 from which the projections 23 project is brought into contact with that side (i.e., one surface) 30 of the flat plate portion 24 to which the smaller-diameter portions 27 are open, so that each projection 23 is prevented from further passing through the hole 25, and the distal end portion of the projection 23 projects outwardly from the hole 25. The flat plate portion 22 and the flat plate portion 24 are superposed together, and the thickness of the superposed portions is generally equal to the thickness of the portion of the projecting piece portion 18 where the flat plate portion 22, 24 is not provided.

Figure 7:
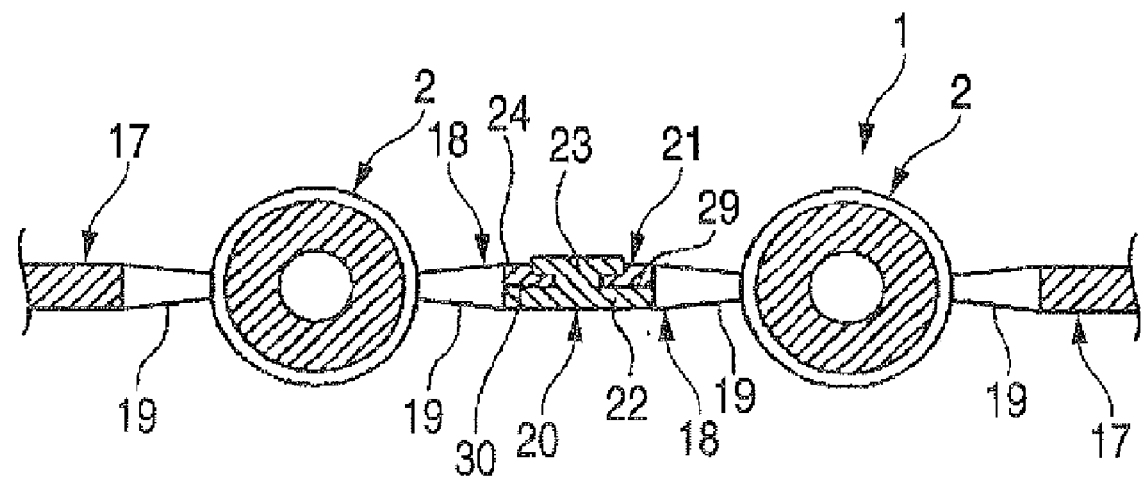
FIG. 7 is a cross-sectional view showing a condition in which the projections of the one short chain-like ferrule structures of FIG. 5 are fused to the respective hole portions of the other short chain-like ferrule structure.

In this condition in which the one surface 29 of the flat plate portion 22 is held in contact with the one surface 30 of the flat plate portion 24, heat or ultrasonic vibration is applied to the distal end portion of each projection 23 projecting from the hole 25, thereby fusing the projection 23 to the hole portion 25 having the projection 23 engaged therein. The distal end portion of the projection 23 is melted by heat, and then upon application of a pressure, the melted distal end portion is spread to fill in the larger-diameter portion 28, and is fused to the larger-diameter portion 28 as shown in FIG. 7. The larger-diameter portion 28 is larger in inner diameter than the smaller-diameter portion 27, and therefore the projection 23 fused to the hole portion 25 is prevented from being separated therefrom both upwardly and downwardly, so that the connection of the two short chain-like ferrule structures 15 with each other is positively maintained.

As described above, the two individual short chain-like ferrule structures 15 each beforehand molded are interconnected in such a manner that the connection portion 20 of one of the two short chain-like ferrule structures 15 is connected to the connection reception portion 21 of the other short chain-like ferrule structure 15. In this manner, the connection of the connection portion 20 and the connection reception portion 21 with each other is repeated for other short chain-like ferrule structures 15, thereby producing the chain-like ferrule structure 1 as shown in FIG. 1.

In the short chain-like ferrule structure 15, the two projections 23, as well as the two holes 25, are arranged on a line parallel to the optical axes of the optical fiber cables 5. Therefore, when the two projections 23 are fitted respectively in the two holes 25, the ferrules 2 of the two adjacent short chain-like ferrule structures 15 are disposed parallel to one another. Namely, the ferrules 2 of the chain-like ferrule structure 1 are arranged parallel to one another.

In the short chain-like ferrule structure 15, the distance from the two projections 23 to the ferrule 2 nearest thereto is half of the distance between any two adjacent ferrules 2, and similarly the distance from the two holes 25 to the ferrule 2 nearest thereto is half of the distance between any two adjacent ferrules. Therefore, the distance between those ferrules 2 of the two adjacent short chain-like ferrule structures 15 (interconnected by connecting the two projections 23 respectively to the two holes 25) which are disposed adjacent to each other is equal to the distance between any two adjacent ferrules 2 of the short chain-like ferrule structure 15, and therefore the ferrules 2 of the chain-like ferrule 1 are arranged at equal intervals.

The chain-like ferrule structure 1 thus assembled is supplied to an assembling machine. An end portion of the optical fiber cable 5 is attached to each ferrule 2 of the chain-like ferrule structure 1, and is fixed thereto, and the interconnecting portion 16 is cut off, and the ferrules 2 are severed one by one from the chair-like ferrule structure 1. The interconnecting portion 16 is reduced in thickness at the connecting portions 19, and therefore can be easily cut off. Thus, the chain-like ferrule structure 1 is assembled by the plurality of short chain-like ferrule structures 15 of the above construction, and further the ferrules 2 are assembled by the chain-like ferrule structure 1.

In this embodiment, the short chain-like ferrule structure 15 includes the plurality of ferrules 2, the connection portion 20, and the connection reception portion 21 engageable with the connection portion 20 of another short chain-like ferrule structure 15. Therefore, two short chain-like ferrule structures 15 can be interconnected by connecting the connection portion 20 of one of the two short chain-like ferrule structures 15 to the connection reception portion 21 of the other short chain-like ferrule structure 15. Therefore, a desired number of short chain-like ferrule structures 15 can be interconnected to produce the chain-like ferrule structure 1 which can be supplied to the assembling machine. And besides, defective short chain-like ferrule structures 15 are beforehand excluded, and only good short chain-like ferrule structures 15 are interconnected to produce the chain-like ferrule structure. Therefore, even when any short chain-like ferrule structure 15 is found to be defective, this can be dealt with by a minimum discard, that is, by discarding only such defective product, without the need for discarding the whole of the chain-like ferrule structure 1 found defective.

The projections 23 are provided at the connection portion 20, and the holes 25 for the passage of the projections 23 therethrough are provided at the connection reception portion 21. Therefore, two short chain-like ferrule structures 15 can be easily interconnected by engaging the projections 23 of the connection portion 20 of one of the two short chain-like ferrule structures 15 respectively in the holes 25 of the connection reception portion 21 of the other short chain-like ferrule structure 15. Therefore, the chain-like ferrule structure 1 which can be supplied to the assembling machine can be easily produced.

The connection portion 20 and the connection reception portion 21, provided respectively at the interconnecting portions 16 of any two adjacent short chain-like ferrule structures 15, are connected together, thereby forming the chain-like ferrule structure 1. Therefore, the short chain-like ferrule structures 15 are beforehand molded, and these molded short chain-like ferrule structures 15 are interconnected, and by doing so, the chain-like ferrule structure 1 can be produced. Therefore, the plurality of ferrules 2 can be sequentially fed, and the operation for connecting the optical fiber cable 5 to the ferrule 2 and other operations can be automated. Furthermore, defective short chain-like ferrule structures 15 are beforehand excluded, and only good short chain-like ferrule structures 15 are interconnected to produce the chain like-ferrule structure 1. Therefore, even when any short chain-like ferrule structure 15 is found to be defective, this can be dealt with by a minimum discard, that is, by discarding only such defective short chain-like ferrule structure, without the need for discarding the whole of the chain-like ferrule structure 1 found defective.

The ferrules 2 are arranged parallel to one another through the interconnecting portions 16. Therefore, the plurality of ferrules 2 can be sequentially fed in a predetermined condition. Therefore, the operation for connecting the optical fiber cable 5 to the ferrule 2 and other operations can be more easily automated.

The ferrules 2 are arranged at equal intervals through the interconnecting portions 16. Therefore, the plurality of ferrules 2 can be sequentially fed in a predetermined condition. Therefore, the operation for connecting the optical fiber cable 5 to the ferrule 2 and other operations can be more easily automated.

The chain-like ferrule structure 1 is produced by connecting together the connection portion 20 and the connection reception portion 21 of any two adjacent molded short chain-like ferrule structures 15. Therefore, the chain-like ferrule structure 1 can be formed, using preselected short chain-like ferrule structures 15. Therefore, defective short chain-like ferrule structures 15 are beforehand excluded, and only good short chain-like ferrule structures 15 are interconnected to produce the chain like-ferrule structure 1. Therefore even when any short chain-like ferrule structure 15 is found to be defective, this can be dealt with by a minimum discard, that is, by discarding only such defective short chain-like ferrule structure, without the need for discarding the whole of the chain-like ferrule structure 1 found defective.

Figure 9:
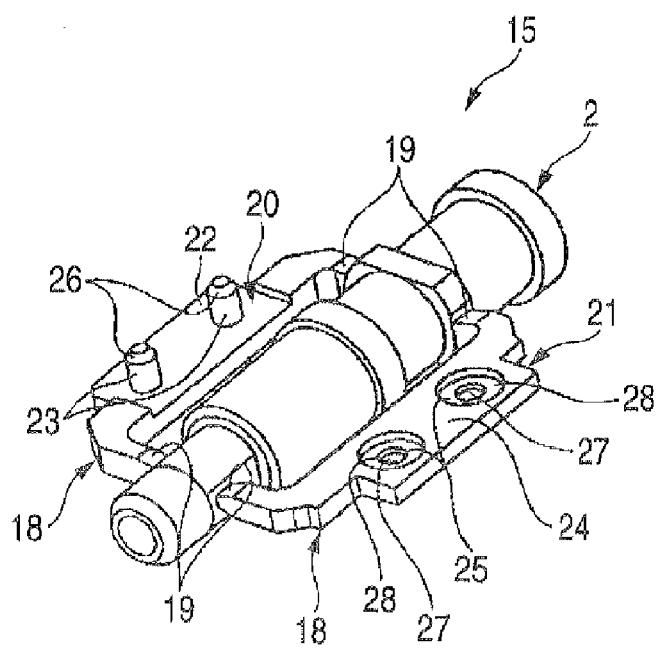
FIG. 9 is a perspective view of a modified example of the short chain-like ferrule structure of FIG. 2.

In the above embodiment, the short chain-like ferrule structure 15 includes the four ferrules. However, in the invention, the short chain-like ferrule 15 may include at least one ferrule. For example, a modified short chain-like ferrule structure 15 shown in FIG. 9 includes one ferrule 2. In this case, the short chain-like ferrule structure 15 includes the single ferrule 2, a first projecting piece portion 18 (serving as an interconnecting portion) projecting from one side of the ferrule 2, and a second projecting piece portion 18 (serving as an interconnecting portion) projecting from the other side of the ferrule 2. Further, a connection portion 20 is provided at the first projecting piece portion 18, and a connection reception portion 21 is provided at the second projecting piece portion 18. In FIG. 9, those portions identical in construction to those of the above embodiment are designated by identical reference numerals, respectively, and explanation thereof is omitted.

Any two adjacent modified short chain-like ferrule structures 15 of FIG. 9 can be interconnected by connecting the connection portion 20 of one of the two short chain-like ferrule structures 15 to the connection reception portion 21 of the other short chain-like ferrule structure 15. Therefore, a chain-like ferrule structure 1 which can be supplied to the assembling machine can be produced by interconnecting a plurality of short chain-like ferrule structures 15. And besides, defective short chain-like ferrule structures 15 are beforehand excluded, and only good short chain-like ferrule structures 15 are interconnected to produce the chain like-ferrule structure 1. Therefore, even when any short chain-like ferrule structure 15 is found to be defective, this can be dealt with by a minimum discard, that is, by discarding only such defective short chain-like ferrule structure, without the need for discarding the whole of the chain-like ferrule structure 1 found defective.

Furthermore, in the above embodiment, any two adjacent short chain-like ferrule structures 15 are fixedly interconnected by engaging the projections 23 of one of the two short chain-like ferrule structures 15 respectively in the holes 25 of the other short chain-like ferrule structure 15 and then by fusing the projections 23 respectively to the hole portions 25. However, in the invention, the connection portion 20 and the connection reception portion 21 can be fixed to each other by any other suitable method than such fusion method. For example, an enlarged-diameter portion larger in diameter than the inner diameter of the smaller-diameter portion 27 can be formed at the distal end portion of each projection 23, in which case when the projection 23 is press-fitted into the hole 25, the connected condition of the projection 23 and hole 25 is maintained by the enlarged-diameter portion passed through the hole 25.

What is claimed is:

1. A short chain ferrule structure including:
a plurality of ferrules adapted to be attached respectively to end portions of optical fiber cables;
an interconnecting portion interconnecting said plurality of ferrules;
a connection portion provided at that portion of said interconnecting portion projecting from the ferrule disposed at one end portion of said short chain ferrule structure; and
a connection reception portion which is provided at that portion of said interconnecting portion projecting from the ferrule disposed at the other end portion of said short chain ferrule structure, and is engageable with said connection portion of another short chain ferrule structure;
wherein a projection is formed at said connection portion, and projects from said interconnecting portion, and a hole for the passage of said projection of another short chain ferrule structure therethrough is formed in said connection reception portion, and extends through said interconnecting portion;
wherein the projection is fused to the hole.

2. A short chain ferrule structure including:
one ferrule adapted to be attached to an end portion of an optical fiber cable;
an interconnecting portion projecting from opposite sides of said ferrule;
a connection portion provided at that portion of said interconnecting portion projecting from one of the opposite sides of said ferrule; and
a connection reception portion which is provided at that portion of said interconnecting portion projecting from the other of the opposite sides of said ferrule, and is engageable with said connection portion of another short chain ferrule structure;
wherein a projection is formed at said connection portion, and projects from said interconnecting portion, and a hole for the passage of said projection of another short chain ferrule structure therethrough is formed in said connection reception portion, and extends through said interconnecting portion;
wherein the projection is fused to the hole.

3. A chain ferrule structure, wherein said chain ferrule structure comprises a plurality of short chain ferrule structures as defined in claim 1 or claim 2; and
any two adjacent short chain ferrule structures are interconnected by engaging said connection portion of one of said two short chain ferrule structures with said connection reception portion of the other short chain ferrule structure.

4. The chain ferrule structure according to claim 3, wherein said ferrules are arranged parallel to one another.

5. The chain ferrule structure according to claim 3, wherein said ferrules are arranged at equal intervals.

6. A method of producing a chain ferrule structure comprising a plurality of short chain ferrule structures, each of said short chain ferrule structures including a plurality of ferrules adapted to be attached respectively to end portions of optical fiber cables, an interconnecting portion interconnecting said plurality of ferrules, a connection portion provided at that portion of said interconnecting portion projecting from the ferrule disposed at one end portion of said short chain ferrule structure, and a connection reception portion which is provided at that portion of said interconnecting portion projecting from the ferrule disposed at the other end portion of said short chain ferrule structure, and is engageable with said connection portion of the adjacent short chain ferrule structure; characterized in that:
said short chain ferrule structures are beforehand molded, and any two adjacent molded short chain ferrule structures are interconnected by engaging said connection portion of one of said two short chain ferrule structures with said connection reception portion of the other short chain ferrule structure, thereby producing said chain ferrule structure;
wherein a projection is formed at said connection portion of the one chain ferrule structure, and projects from said interconnecting portion, and a hole for the passage of said projection of the other short chain ferrule structure therethrough is formed in said connection reception portion, and extends through said interconnecting portion;
wherein the projection is fused to the hole.

7. A combination, comprising:
the short chain ferrule structure according to claim 1 or claim 2, and the other short chain ferrule structure, wherein each of the short chain ferrule structures is a discrete, solid unit.

8. The method according to claim 6, wherein each of the two adjacent molded short chain ferrule structure is a discrete, solid unit.

9. The short chain ferrule structure according to claim 1, wherein a larger-diameter portion which is larger in diameter than the hole is formed on the connection reception portion so that the fused projection is spread to fill in the larger-diameter portion.

10. The short chain ferrule structure according to claim 2, wherein a larger-diameter portion which is larger in diameter than the hole is formed on the connection reception portion so that the fused projection is spread to fill in the larger-diameter portion.

11. The method according to claim 6, wherein the fused projection is spread to fill in a larger-diameter portion which is larger in diameter than the hole and is formed on the connection reception portion.

* * * * *